United States Patent
Watanabe (10) Patent No.: US 11,378,933 B2
(45) Date of Patent: Jul. 5, 2022

(54) NUMERICAL CONTROL DEVICE AND MACHINE TOOL FOR CONTROLLING AT LEAST TWO OSCILLATING DRIVE AXES

(71) Applicant: FANUC CORPORATION, Yamanashi (JP)

(72) Inventor: Toshihiro Watanabe, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 64 days.

(21) Appl. No.: 16/813,583

(22) Filed: Mar. 9, 2020

(65) Prior Publication Data

US 2020/0293016 A1    Sep. 17, 2020

(30) Foreign Application Priority Data

Mar. 14, 2019  (JP) .............................. JP2019-047160

(51) Int. Cl.
  *G05B 19/416*    (2006.01)
  *G05B 19/404*    (2006.01)

(52) U.S. Cl.
  CPC .. *G05B 19/404* (2013.01); *G05B 2219/34015* (2013.01); *G05B 2219/50217* (2013.01)

(58) Field of Classification Search
  CPC .................................................. G05B 19/4163
  USPC ....................................................... 700/173
  See application file for complete search history.

(56) References Cited

U.S. PATENT DOCUMENTS

| 2016/0266567 | A1* | 9/2016 | Watanabe | ............ B23Q 15/013 |
| 2017/0036273 | A1* | 2/2017 | Choi | ........................ F15B 7/008 |
| 2020/0101538 | A1* | 4/2020 | Kitakaze | ................... B23B 1/00 |
| 2020/0379438 | A1* | 12/2020 | Kato | .................... G05B 19/414 |

FOREIGN PATENT DOCUMENTS

| CN | 204673103 U | * | 9/2015 | |
| JP | H05-309501 A | | 11/1993 | |
| JP | 2002-268715 A | | 9/2002 | |
| JP | 2017-056515 A | | 3/2017 | |
| JP | 2017-127960 A | | 7/2017 | |
| JP | 2020-013355 A | | 1/2020 | |
| WO | 2016/038687 A1 | | 3/2016 | |
| WO | WO-2018135788 A1 | * | 7/2018 | ............ B23B 25/06 |
| WO | 2018/181447 A1 | | 10/2018 | |
| WO | 2020/084771 A1 | | 4/2020 | |

OTHER PUBLICATIONS

An Office Action; "Notice of Reasons for Refusal", mailed by the Japanese Patent Office dated Jul. 20, 2021, which corresponds to Japanese Patent Application No. 2019-047160 and is related to U.S. Appl. No. 16/813,583; with English language translation.

* cited by examiner

*Primary Examiner* — Suresh Suryawanshi
(74) *Attorney, Agent, or Firm* — Studebaker & Brackett PC (57) ABSTRACT

A numerical control device according to an embodiment of the present disclosure is a numerical control device for controlling at least two oscillating drive axes which linearly drive so as to cause mutually differing targets to change speed regularly at a fixed period, based on a machining program, in which the numerical control device controls the at least two oscillating drive axes so as to keep fixed a phase difference of periodic variable components of the at least two oscillating drive axes.

15 Claims, 7 Drawing Sheets

NUMERICAL CONTROL DEVICE AND MACHINE TOOL FOR CONTROLLING AT LEAST TWO OSCILLATING DRIVE AXES

BACKGROUND OF THE INVENTION

This application is based on and claims the benefit of priority from Japanese Patent Application No. 2019-047160, filed on 14 Mar. 2019, the content of which is incorporated herein by reference.

Field of the Invention

The present invention relates to a numerical control device and a machine tool.

Related Art

Machine tools such as a lathe, for example, have been used which have a spindle that causes a cutting tool to rotate relative to a workpiece which is a machining target; and a feed axis that causes the cutting tool to relatively move in a direction parallel to the rotation axis of the spindle relative to the workpiece, and which makes the spindle and feed axis cooperatively operate to cut the workpiece by way of the cutting tool. In such a machine tool, the spindle, feed axis and other drive axes are often controlled by a numerical control device.

With a machine tool such as a lathe, since the cutting edge of the cutting tool continuously cuts off material on a surface of the workpiece, the material cut off becomes long, thin shavings (chips) depending on the material properties of the workpiece, and there is a possibility of hindering the machining of the workpiece by clinging to the cutting tool. Cr contrast, as disclosed in Patent Document 1, for example, technology has been known which performs oscillating cutting of causing a cutting tool to reciprocally move relative to a workpiece by regularly changing the speed of the cutting tool in a fixed period using a numerical control device. With oscillating cutting, since the cutting tool is periodically distanced from the workpiece by way of reciprocally moving the cutting tool, the shavings are shredded to a certain length.

In addition, in order to perform machining efficiently, a machine tool has been known which can simultaneously drives a plurality of workpieces and a plurality of tools corresponding to each of the workpieces, as in the parallel two-spindle lathe disclosed in Patent Document 2, for example.

Patent Document 1: Japanese Unexamined Patent Application, Publication. No. 2017-56515
Patent Document 2: Japanese Unexamined Patent Application, Publication No. H05-309501

SUMMARY OF THE INVENTION

In the case of adopting a machine tool having such oscillating cutting as disclosed in Patent Document 1 in a machine tool having a plurality of independent drive axes as in the parallel two-axis lathe disclosed in Patent Document 2, there is a possibility of the oscillating of drive axis causing a plurality of tools, etc. to reciprocally move overlapping, and the overall machine tool vibrating according to the oscillating period of the drive axis. If this is done, there is concern of inconveniences occurring such as abnormal load arising on the machine tool, tool wear increasing, and the machining precision declining.

Therefore, the present disclosure has an object of providing a numerical control device and machine tool which can suppress the vibration of a machine tool that periodically varies the speeds of a plurality of drive axes.

A numerical control device according to an aspect of the present disclosure is a numerical control device that controls at least two oscillating drive axes which linearly drive so as to cause mutually differing targets to change speed regularly at a fixed period, based on a machining program, in which the numerical control device controls the at least two oscillating drive axes so as to keep fixed a phase difference of periodic variable components of the at least two oscillating drive axes.

According to the present disclosure, it is possible to provide a numerical control device which can suppress vibration of a machine tool that causes the speed of a plurality of drive axes to vary periodically.

DETAILED DESCRIPTION OF THE INVENTION

Figure 1:
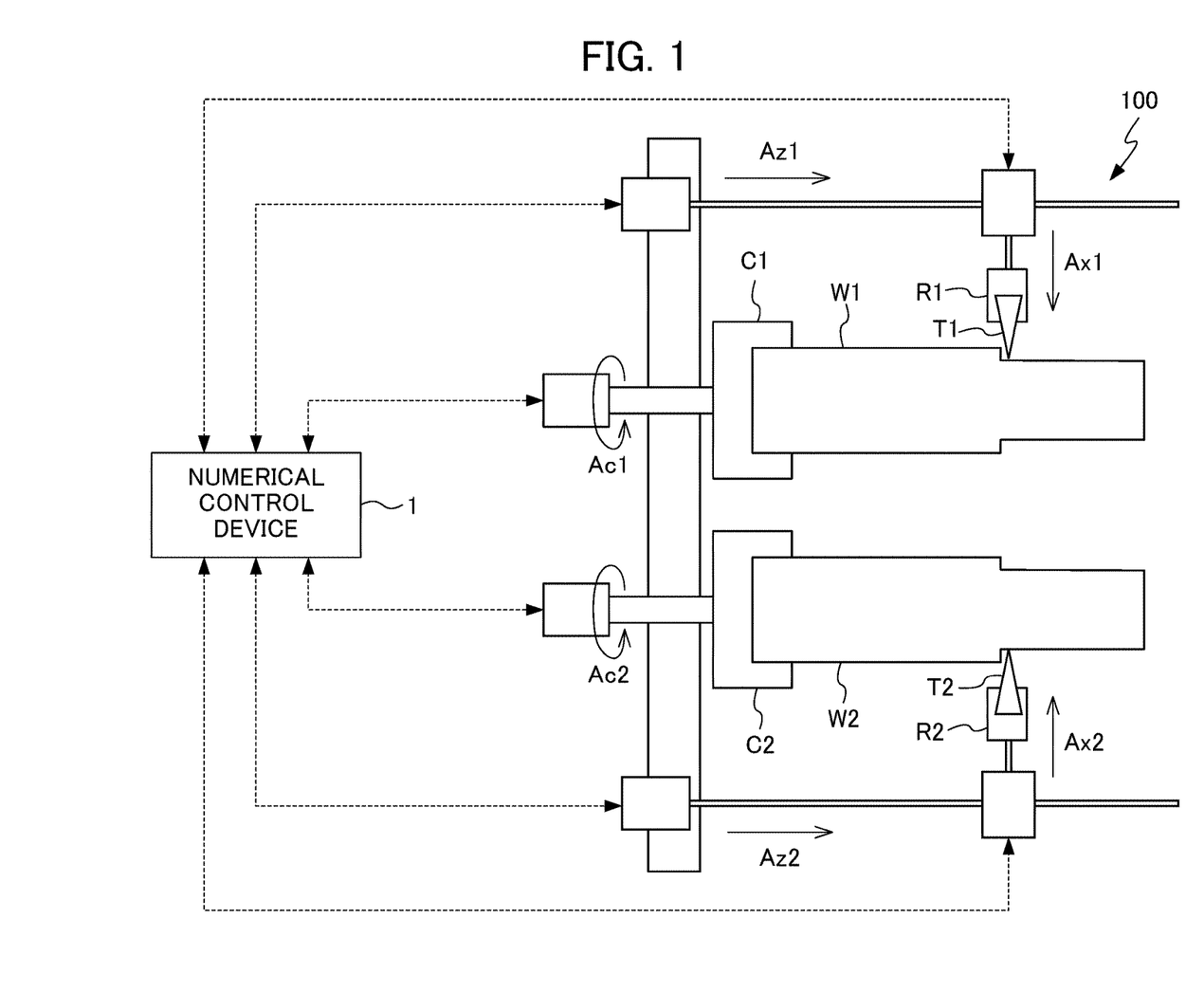
FIG. 1 is a schematic drawing showing the configuration of a machine tool according to a first embodiment of the present disclosure.
Figure 2:
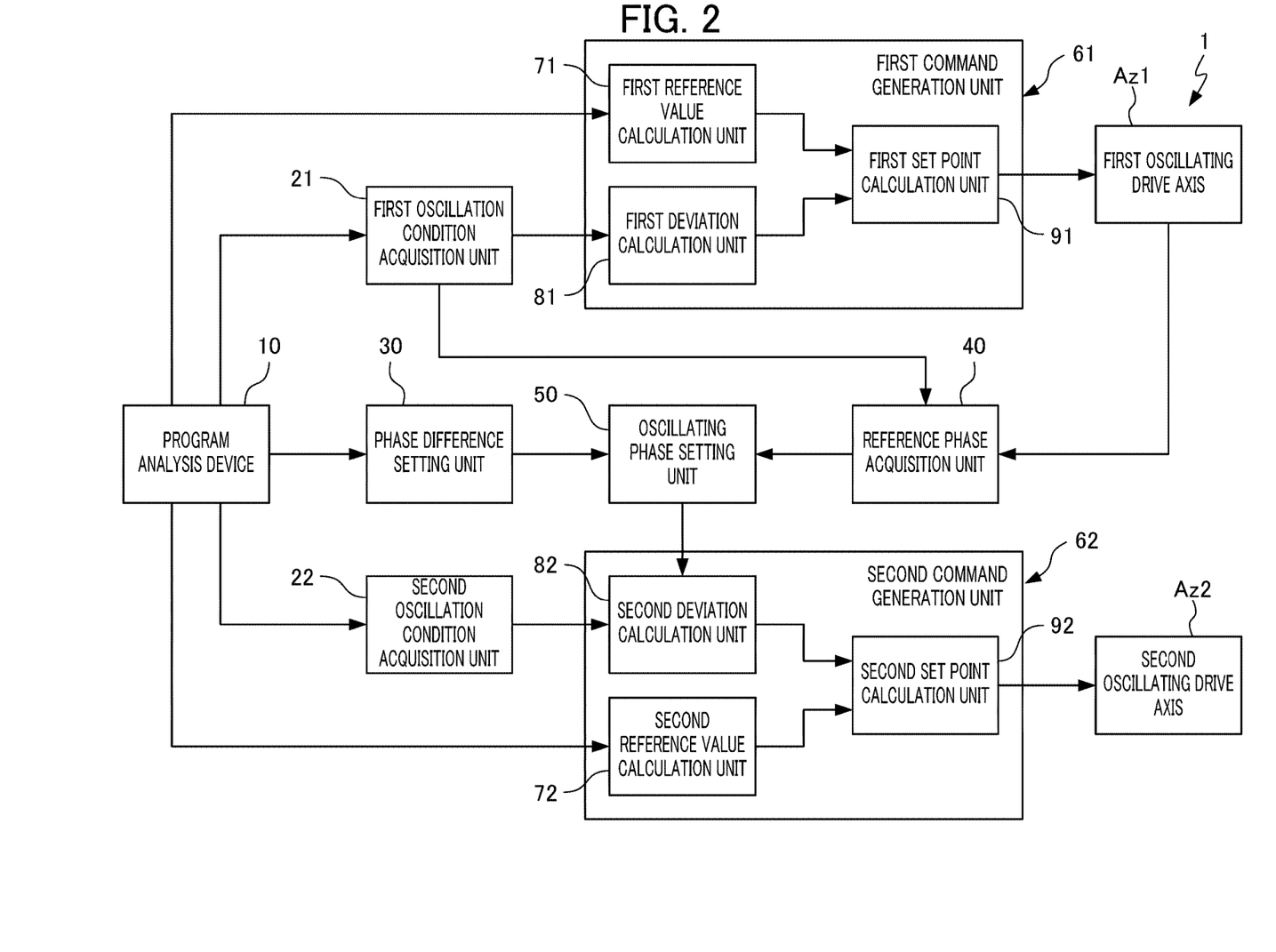
FIG. 2 is a block diagram showing the configuration of a numerical control device for the machine tool in FIG. 1.

Hereinafter, an embodiment of a machine tool according to an embodiment of the present disclosure will be explained while referencing the drawings. FIG. 1 is a schematic drawing showing the configuration of a machine tool 100 according to a first embodiment of the present disclosure. FIG. 2 is a block diagram showing the configuration of a numerical control device of the machine tool in FIG. 1.

The machine tool 100 includes: a numerical control device 1 which itself is an embodiment of the numerical control device according to the present disclosure; and a plurality of drive axes controlled by the numerical control device 1 (first spindle Ac1, second spindle Ac2, first oscillating drive axis Az1, second oscillating drive axis Az2, first cutting axis Ax1 and second cutting axis Ax2). The machine tool 100 of the present embodiment is a so-called parallel twin-spindle lathe.

In more detail, the machine tool 100 includes: two chucks (first chuck C1 which holds a first workpiece W1, and second chuck C2 which holds a second workpiece W2) which independently rotate by way of two spindles Ac1, Ac2 which are parallel to each other, and hold each workpiece (first workpiece W1 which rotates by way of the first spindle Ac1, second workpiece W2 which rotates by way of the second spindle Ac2). In addition, the machine tool 100 includes: a first tool rest R1 which holds a first cutting tool (first target) T1 that is linearly driven by the first oscillating driving axis Az1 and first cutting axis Ax1, and cuts the first workpiece W1; and a second tool rest R2 which is linearly driven by the second oscillating driving axis Az2 and second cutting axis Ax2, and holds the second cutting tool (second target different from first target) that cuts the second workpiece W2. In the machine tool 100, the oscillating drive axes Az1, Az2 are drive axes (feed axes) which cause the tools T1, T2 to move in parallel to the spindles Ac1, Ac2, and the cutting axes Ax1, Ax2 are drive axes which cause the tools T1, T2 to move in a direction perpendicular to the spindles Ac1, Ac2 and oscillating drive axes Az1, Az2.

The numerical control device 1 controls the spindles Ac1, Ac2, oscillating drive axes Az1, Az2, and first cutting axes Ax1 and second cutting axis Ax2. The numerical control device 1 most importantly controls the two oscillating drive axes Az1, Az2 so as to cause the different targets (cutting tools T1, T2) to each change in velocity regularly at a fixed period. Characteristically, the numerical control device 1 controls the two oscillating drive axes Az1, Az2 so as keep constant (substantially a half period) the phase difference of the periodic variable components of the two oscillating drive axes Az1, Az2 that drive the cutting tools T1, T2 in parallel directions to each other. For this reason, the frequency of the velocity change of the first oscillating drive axis Az1 and a frequency of the velocity change of the second oscillating drive axis Az2 are controlled so as to be equal values.

As the specific configuration, the numerical control device 1 can be established as a configuration that includes: a program analysis unit 10 which analyzes a machining program; an oscillation condition acquisition unit (first oscillation condition acquisition unit 21 which acquires an amplitude and a frequency of a periodic variable component of first oscillating drive axis Az1, and second oscillation condition acquisition unit 22 which acquires a amplitude and a frequency of periodic a variable component of second oscillating drive axis Az2) which acquires the amplitude and a frequency of the periodic variable components of the two oscillating drive axes Az1, Az2 from the machining program analyzed by the program analysis unit 10; a phase difference setting unit 30 which sets the phase difference of the periodic variable components of the two oscillating drive axes Az1, Az21; a reference phase acquisition unit 40 which acquires the phase of the first oscillating drive axis Az1 (specific oscillating drive axis) serving as a reference; an oscillating phase setting unit 50 which assigns different phases to the first oscillating drive axis Az1 and second oscillating drive axis Az2, so that the phase difference set by the phase difference setting unit 30 is obtained relative to the oscillating drive axes Az1, Az2; and a command generation unit (first command generation unit 61 which generates the command signal causing the first oscillating drive shaft Az1 to operate and the second command generation unit 62 which generates the command signal causing the second oscillating drive axis Az2 to operate) which generates command signals that cause the oscillating drive axes Az1, Az2 to operate in the phases assigned by the oscillating phase setting unit 50.

The numerical control device 1 can be realized by reading the appropriate program into a computer device having a CPU, memory, etc. In addition, each constituent element of the numerical control device 1 may be functionally distinguished, or may not necessarily be clearly distinguishable in the physical configuration and in the structure of a program for realizing the numerical control device 1.

The program analysis unit 10 calculates information for deciding the set point for every time of the spindles Ac1, Ac2, oscillating drive axes Az1, Az2 and cutting axis Ax1 and second cutting axis Ax2. The information calculated by the program analysis unit 10 includes the rotation of the spindles Ac1, Ac2, the feed speed not including the oscillation component of the oscillating drive axes Az1, Az2, a amplitude and a frequency which are periodic variable components of oscillating drive axes Az1, Az2 (may be provided as information of speed variation, or may be provided as information of position variation), cutting speed of cutting axes Ax1, Ax2, and periodic variable components of first oscillating drive axis Az1 and second oscillating drive axis Az2, phase difference which there should be in periodic variable components between the first oscillating drive axis Az1 and second oscillating drive axis Az2, etc.

The first oscillation condition acquisition unit 21 acquires information related to driving of the first oscillating drive axis Az1 from the program analysis unit 10, more specifically, the feed speed of the first oscillating drive axis Az1, and a amplitude and a frequency of a periodic variable component of the first oscillating drive axis Az1. The second oscillation condition acquisition unit 22 acquires information related to driving of the second oscillating drive axis Az2 from the program analysis unit 10, more specifically, the feed speed of the second oscillating drive axis Az2, and an amplitude and a frequency of a periodic variable component of the second oscillating drive axis Az2.

The phase difference setting unit 30 acquires the phase difference, etc. which there should be in the periodic variable component between the first oscillating drive axis Az1 and second oscillating drive axis Az2 from the program analysis unit 10, and assigns the phase difference of the first oscillating drive axis Az1 and second oscillating drive axis Az2 relative to the phase serving as reference. In the numerical control device 1 of the present embodiment, the phase difference setting unit 30 assigns a phase equal to the phase depending on the internal time by doing nothing to the first oscillating drive axis Az1, and assigns a phase to the second oscillating drive axis Az2 which is advanced about half a cycle relative to the first oscillating drive axis Az1. In other words, the phase difference setting unit 30 sets a master-slave relationship between the two oscillating drive axes Az1, Az2. It should be noted that "about half a cycle" indicates a phase difference of preferably at least 135° and no more than 225°, more preferably at least 150° and no more than 210°, and even more preferably at least 165° and no more than 195°.

The reference phase acquisition unit 40 calculates the current phase of the first oscillating drive axis Az1, based on the value of the feedback signal of the first oscillating drive axis Az1, and the amplitude and the frequency of the periodic variable component acquired by the first oscillation condition acquisition unit 21. In other words, the numerical control device of the present embodiment establishes the first oscillating drive axis Az1 as the master drive axis which is controlled independently, and establishes the second oscillating drive axis Az2 as the slave drive axis which is controlled subordinate to the master drive axis.

The oscillation phase setting unit 50 calculates the target phase of the second oscillating drive axis Az2, by adding the phase difference set by the phase difference setting unit 30 to the phase of the first oscillating drive axis Az1.

The first command generation unit 61 calculates the set point of the first oscillating drive axis Az1 and outputs the command signal for the first oscillating drive axis Az1, based on the amplitude and the frequency of the periodic variable component of the first oscillating drive axis Az1 acquired by the first oscillation condition acquisition unit 21, and the feed speed of the first oscillating drive axis Az1 acquired by the program analysis unit 10. The second command generation unit 62 calculates the set point of the second oscillating drive axis Az2, and outputs as the command signal for the second oscillating drive axis Az2, based on the target phase calculated by the oscillating phase setting unit 50, amplitude and a frequency of the periodic variable component of the second oscillating drive axis Az2 acquired by the second oscillation condition acquisition unit 22, and the feed speed of the second oscillating drive axis Az2 acquired from the program analysis unit 10.

As the specific configuration, the first command generation unit 61 has the first reference value calculation unit 71 which calculates the reference value for operation of the first oscillating drive axis Az1 not including a periodic variable component, based on the feed speed of the first oscillating drive axis Az1 acquired from the phase program analysis unit 10; first deviation calculation unit 81 which calculates the deviation (difference from reference value) which periodically changes in phase matching the amplitude and the frequency of the periodic variable components acquired by the first oscillation condition acquisition unit 21, as well as a phase depending on the internal time; and a first set point calculation unit 91 which calculates the set point of the first oscillating drive axis Az1 by summing up the reference value calculated by the first reference value calculation unit 71 and the deviation calculated by the first deviation calculation unit 81. In addition, the second command generation unit 62 has a second reference value calculation unit 72 which calculates a reference value for operation of the second oscillating drive axis Az2 not including periodic variable component, based on the feed speed of the second oscillating drive axis Az2 acquired from the program analysis unit 10; a second deviation calculation unit 82 which calculates deviation which periodically changes in an amplitude and a frequency of the periodic variable component acquired by the second oscillation condition acquisition unit 22, and a phase assigned by the oscillating phase setting unit 50; and a second set point calculation unit 92 which calculates the set point for the second oscillating drive axis Az2 by summing up the reference value calculated by the second reference value calculation unit 72 and the deviation calculated by the second deviation calculation unit 82.

The reference value calculation units 71, 72 calculate the reference value corresponding to a fixed speed excluding the periodic variable component from the speeds that the oscillating drive axes Az1, Az2 should have. As the reference values calculated by the reference value calculation units 71, 72, it is possible to establish a fixed value indicating speed, a value indicating the position which changes in proportion to time, or the like.

The deviation calculation units 81, 82 calculate deviation which is the periodic variable component of the second oscillating drive axis Az2, based on the phase assigned by the oscillating phase setting unit 50, and the amplitude and the frequency of the periodic variable component of the oscillating drive axes Az1, Az2 acquired by the oscillation condition acquisition units 21, 22. More specifically, the deviation Δ1 of the first oscillating drive axis Az1 can be calculated as $\Delta 1 = h1 \cdot \sin(360° \cdot f \cdot t)$, using the amplitude h1, the frequency f and internal time t (origin can be set to any time), for example. It should be noted that, in the present embodiment, the phase θ1 of the set point of the first oscillating drive axis Az1 is 0°. On the other hand, the phase θ2 of the set point of the second oscillating drive axis Az2 can be calculated as $\theta 2 = \theta 1 + 180°$, using the phase θ1 of the first oscillating drive axis Az1 acquired by the reference phase acquisition unit 40, for example.

In addition, the deviation calculation units 81, 82 may establish the value of deviation as "0" until the phase of the second oscillating drive axis Az2 set by the oscillating phase setting unit 50 first becomes "0°", for example. In other words, the numerical control device 1 may be configured so as not to change the drive speed of the second oscillating drive axis Az2 until the phase of the first oscillating drive axis Az1 becomes 180°.

In the above way, the numerical control device 1 of the machine tool 100 controls the two oscillating drive axes Az1, Az2 so as to keep fixed the phase difference between the periodic variable component of the oscillating drive axis Az1 driving the first cutting tool T1, and the periodic variable component of the oscillating drive axis Az2 driving the second cutting tool T2. For this reason, in the machine tool 100, the force acting on the first workpiece W1 by the first cutting tool T1, and the force acting on the second workpiece W2 by the second cutting tool T2 become substantially opposite phases. For this reason, the first oscillating drive axis Az1 and second oscillating drive axis Az2 will not simultaneously apply force in the same direction, on a structure retaining the first chuck C1 which retains the first workpiece W1 and the second chuck C2 which retains the second workpiece. The machine tool 100 can thereby prevent the occurrence of excessive load due to vibration, decline in machining precision, abnormal wear, etc. of the cutting tools T1, T2, since it is possible to suppress vibration of the device overall.

The numerical control device 1 can relatively easily keep fixed the phase difference between the first oscillating drive axis Az1 and second oscillating drive axis Az2, by having the oscillation condition acquisition units 21, 22, phase difference setting unit 30, oscillating phase setting unit 50, and command generation units 61, 62.

In the numerical control device 1, the second oscillating phase setting unit 50 can set the phase of the second oscillating drive axis Az2 relatively easily, due to calculating the phase of the second oscillating drive axis Az2, by adding the phase difference set by the phase difference setting unit 30 to the phase of the first oscillating drive axis Az. At this time, it is possible to further suppress an increase in computational load by setting the phase of the first oscillating drive axis Az1 serving as reference to "0°".

In addition, with the numerical control device 1 of the present embodiment, the reference phase acquisition unit 40 calculates the actual phase of the first oscillating drive axis Az1, based on the value of the feedback signal of the first oscillating drive axis Az1, and the oscillating phase setting unit 50 decides the phase of the set point of the second oscillating drive axis Az2, by adding the phase difference set by the phase difference setting unit 30 to the actual phase of the first oscillating drive axis Az1. For this reason, the numerical control device 1 can control the phase difference between the first oscillating drive axis Az1 and the second oscillating drive axis Az2 with relatively high precision. The machine tool 100 can thereby reliably suppress vibration.

In addition, the numerical control device 1 can reliably prevent the forces applied by the two oscillating drive axes Az1, Az2 from being overlapped and becoming large, due to controlling the two oscillating drive axes Az1, Az2 so as to keep the phase difference of the periodic variable components of the two oscillating drive axes Az1, Az2 driving the cutting tools T1, T2 in parallel directions to each other at substantially a half period. In this case, it is preferable for the amplitude of the periodic variable components of the two oscillating drive axes Az1, Az2 to be substantially equal, so as to be able to machine the two workpieces evenly. It should be noted that "amplitudes substantially equal" indicates that the ratio of the larger amplitude to the smaller amplitude is preferably no more than 1.5, more preferably not more than 1.2, and even more preferably no more than 1.1.

Figure 3:
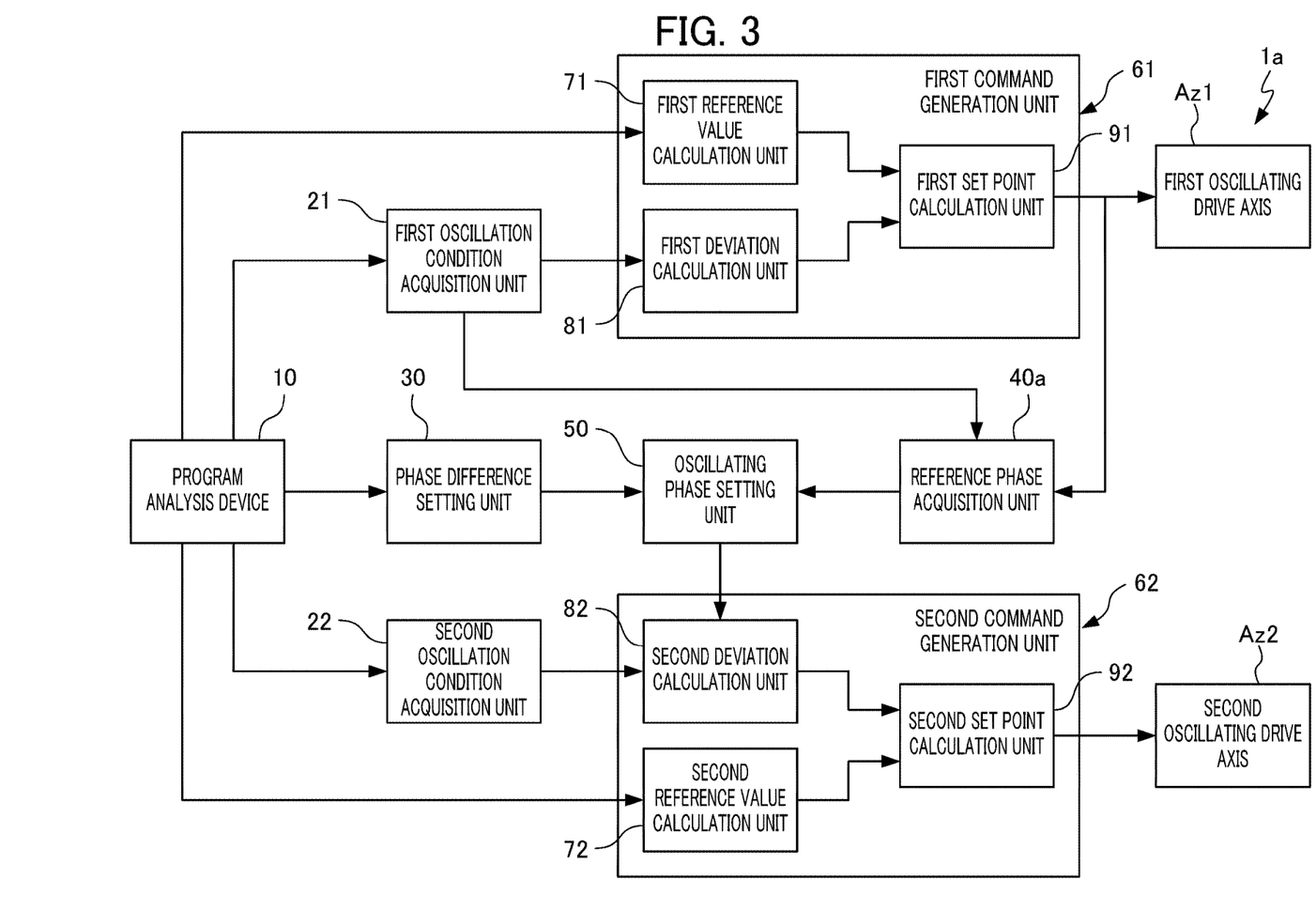
FIG. 3 is a block diagram showing the configuration of a numerical control device according to a second embodiment of the present disclosure.

Next, a numerical control device 1a according to a second embodiment of the present disclosure will be explained. FIG. 3 is a block diagram showing the configuration of the numerical control device 1a which can be used in place of the numerical control device 1 of FIG. 2 in the machine tool 100 of FIG. 1.

The numerical control device 1a can be established as a configuration including: the program analysis unit 10 which analyzes machining programs; an oscillation condition acquisition unit which acquires the amplitude and the frequency of the periodic variable components of the two oscillating drive axes Az1, Az2 from the machining program analyzed by the program analysis unit 10 (first oscillation condition acquisition unit 21 which acquires the amplitude and the frequency of the periodic variable component of the first oscillating drive axis Az1, and second oscillation condition acquisition unit 22 which acquires the amplitude and the frequency of the periodic variable component of the second oscillating drive axis Az2) the phase difference setting unit 30 which sets the phase difference of the periodic variable component of the two oscillating drive axes Az1, Az2; a reference phase acquisition unit 40a which acquires the phase of the first oscillating drive axis Az1 serving as the reference; an oscillating phase setting unit 50 which assigns different phases to the first oscillating drive axis Az1 and second oscillating drive axis Az2, so that the phase difference set by the phase difference setting unit 30 is obtained in the oscillating drive axes Az1, Az2; and a command generation unit which generates command signals causing the oscillating drive axes Az1, Az2 to operate in the phases assigned by the oscillating phase setting unit 50b (first command generation unit 61 which generates a command signal causing the first oscillating drive axis Az1 to operate, and second command generation unit 62 which generates a command signal causing the second oscillating drive axis Az2 to operate).

The configuration of the numerical control device 1a in FIG. 3 is similar to the configuration of the numerical control device 1 in FIG. 1, except for the point of the configuration of a reference phase acquisition unit 40a differing from the configuration of the reference phase acquisition unit 40 of the numerical control device 1 in FIG. 2. For this reason, for this and later embodiments, the same reference symbols will be attached to constituent elements which are the same as the constituent elements previously explained, and redundant explanations will be omitted.

The reference phase acquisition unit 10a calculates the current phase of the first oscillating drive device Az1, based on the value of the command signal to the first oscillating drive axis Az1 from the first command generation unit 61 (set point calculated by the first set point calculation unit 91), and the amplitude and the frequency of the periodic variable component acquired by the first oscillation condition acquisition unit 21.

In the numerical control device 1a of the present embodiment, the reference phase acquisition unit 40a calculates the current phase of the first oscillating drive axis Az1 based on the value of the command signal to the first oscillating drive axis Az1 by the reference phase acquisition unit 40a, and the oscillating phase setting unit 50 decides the phase of the set point of the second oscillating drive axis Az2 by adding the phase difference set by the phase difference setting unit 30 to the actual phase of the first oscillating drive axis Az1. For this reason, the numerical control device 1a cannot confirm the actual phase of the first oscillating drive axis Az1; however, so long as the first oscillating drive axis Az1 is appropriately controlled, it is possible to control the phase difference between the first oscillating drive axis Az1 and second oscillating drive axis Az2 with relatively high precision. In addition, the numerical control device 1a can control with relatively high precision the phase difference between the first oscillating drive axis Az1 and second oscillating drive axis Az2, even in a case of the error in control of the first oscillating drive axis Az1 being great, or a case of there being a lot of noise in the feedback signal from the first oscillating drive axis Az1, due to not using the feedback signal from the first oscillating drive axis Az1.

Figure 4:
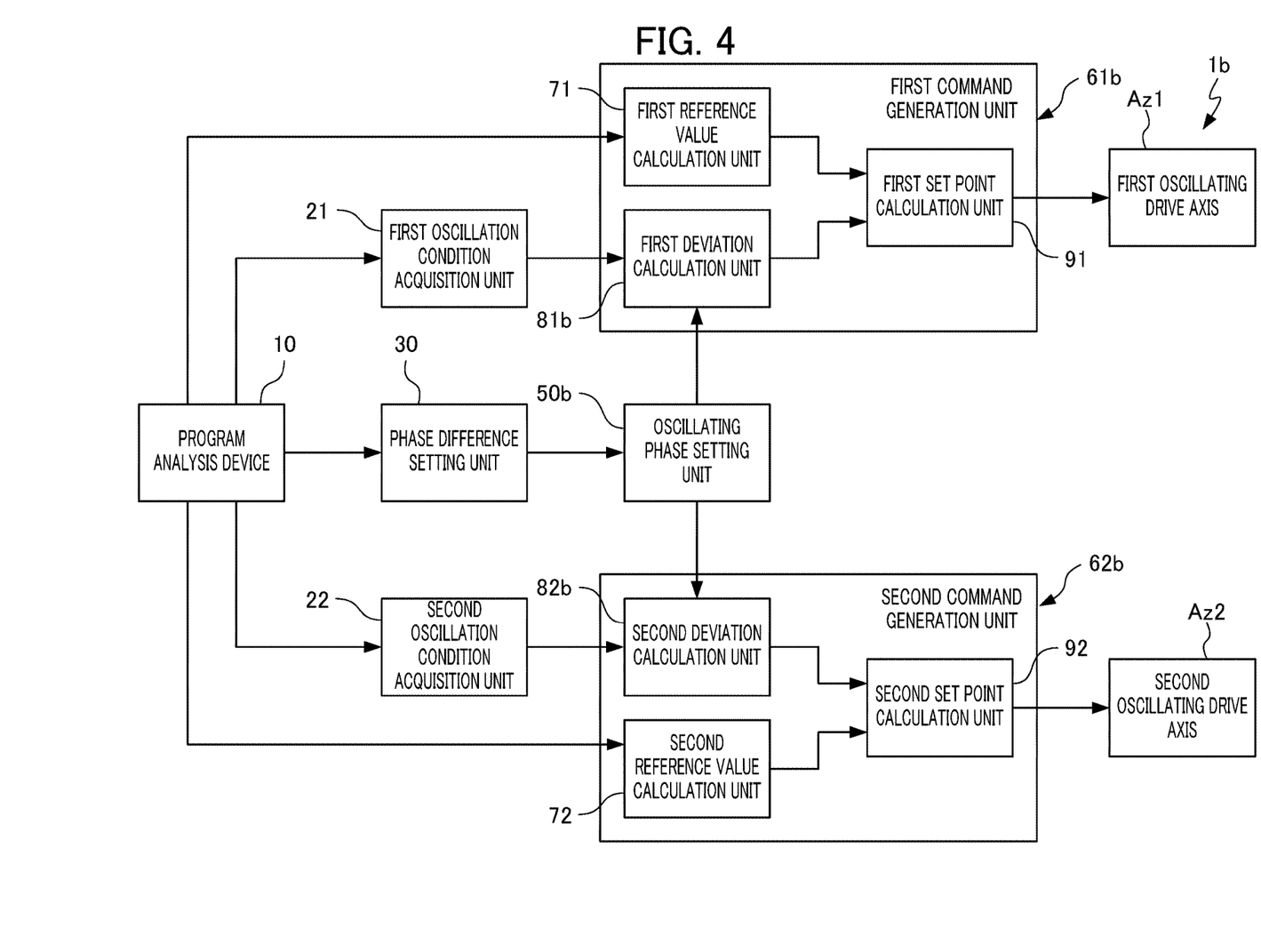
FIG. 4 is a block diagram showing the configuration of a numerical control device according to a third embodiment of the present disclosure.

Furthermore, a numerical control device 1b according to a third embodiment of the present disclosure will be explained. FIG. 4 is a block diagram showing the configuration of the numerical control device 1b which can be used in place of the numerical control device 1 of FIG. 2 in the machine tool 100 of FIG. 1.

The numerical control device 1b can be established as a configuration including: the program analysis unit 10 which analyzes machining programs; an oscillation condition acquisition unit which acquires the amplitude and the frequency of the periodic variable components of the two oscillating drive axes Az1, Az2 from the machining program analyzed by the program analysis unit 10 (first oscillation condition acquisition unit 21 which acquires the amplitude and the frequency of the periodic variable component of the first oscillating drive axis Az1, and second oscillation condition acquisition unit 22 which acquires the amplitude and the frequency of the periodic variable component of the second oscillating drive axis Az2); the phase difference setting unit 30 which sets the phase difference of the periodic variable component of the two oscillating drive axes Az1, Az2; an oscillating phase setting unit 50b which assigns different phases to the first oscillating drive axis Az1 and second oscillating drive axis Az2, so that the phase difference set by the phase difference setting unit 30 is obtained; and a command generation unit which generates command signals causing the oscillating drive axes Az1, Az2 to operate in the phases assigned by the oscillating phase setting unit 50b (first command generation unit 61b which generates a command signal causing the first oscillating drive axis Az1 to operate, and second command generation unit 62b which generates a command signal causing the second oscillating drive axis Az2 to operate).

The oscillating phase setting unit 50b gives different offsets $\varphi 1, \varphi 2 (\varphi 1 - \varphi 2 \approx 180°)$ relative to the phase depending on the internal time of the numerical control device 1b to the first command generation unit 61 and second command generation unit 62. In other words, the numerical control device 1b of the present embodiment does not set the master-slave relationship between the first oscillating drive axis Az1 and second oscillating drive axis Az2.

The first command generation unit 61b has: a reference value calculation unit 71 which calculates a reference value for the first oscillating drive axis Az1, based on the feed speed of the first oscillating drive axis Az1 acquired from the program analysis unit 10; a first deviation calculation unit 81b which calculates deviation which periodically changes based on the amplitude and the frequency of the periodic variable component acquired by the first oscillation condition acquisition unit 21, as well as the phase depending on the internal time of the numerical control device 1b and the offset given from the oscillating phase setting unit 50b; and a first set point calculation unit 91 which calculates the set point of the first oscillating drive axis Az1 by summing up the reference value calculated by the first reference value calculation unit 71 and the deviation calculated by the first deviation calculation unit 81b. Similarly, the second command generation unit 62b has: a reference value calculation unit 72 which calculates a reference value for the second oscillating drive axis Az2, based on the feed speed of the second oscillating drive axis Az2 acquired from the program analysis unit 10; a second deviation calculation unit 82b which calculates deviation which periodically changes based on the amplitude and the frequency of the periodic variable component acquired by the second oscillation condition acquisition unit 22, as well as the phase depending on the internal time of the numerical control device 2b and the offset given from the oscillating phase setting unit 50b; and a second set point calculation unit 92 which calculates the set point of the second oscillating drive axis Az2 by summing up the reference value calculated by the second reference value calculation unit 72 and the deviation calculated by the second deviation calculation unit 82b.

The first deviation calculation unit 81b can calculate the deviation $\Delta 1$ as $\Delta 1 = h1 \cdot \sin(360° \cdot f \cdot t + \varphi 1)$, for example. In this case, the second deviation calculation unit 82b can calculate the deviation. $\Delta 2$ as $\Delta 2 = h2 \cdot \sin(360° \cdot f \cdot t + \varphi 2)$, for example. In this way, the first command generation unit 61 and second command generation unit 62 can prevent the operation of the first oscillating drive axis Az1 and second oscillating drive axis Az2 from overlapping and causing the machine tool 100 to greatly vibrate, with relatively small computational load, by calculating the set points of the first oscillating drive axis Az1 and second oscillating drive axis Az2 as time functions, respectively.

Although embodiments of a numerical control device and machine tool according to the present disclosure have been explained above, the numerical control device and machine tool according to the present disclosure are not to be limited to the aforementioned embodiments. In addition, the effects described in the present embodiments are merely listing the most preferred effects produced from the present disclosure, and the effects from the numerical control device and machine tool according to the present disclosure are not to be limited to those described in the present embodiment.

The numerical control device according to the present disclosure may control three or more oscillating drive axes so as to keep fixed the phase difference of the periodic variable components of the at least three oscillating drive axes. As an example, in the case of controlling each of three cutting tools performing similar cutting by way of three oscillating drive axes, the numerical control device according to the present disclosure may control the three oscillating drive axes so as to keep in a state shifting each phase of the periodic variable component of each oscillating drive axis by 120°. It is thereby possible to prevent the acting force by the three oscillating drive axes from overlapping and producing large vibration. In this case, with the phase of one oscillating drive axis among the three oscillating drive axes as a reference, the phase of the other two oscillating drive axes may be controlled so that the phase difference relative to the phase serving as reference becomes a fixed angle in other words, a plurality of slave drive axes may be made subordinate to one master drive axis.

Figure 5:
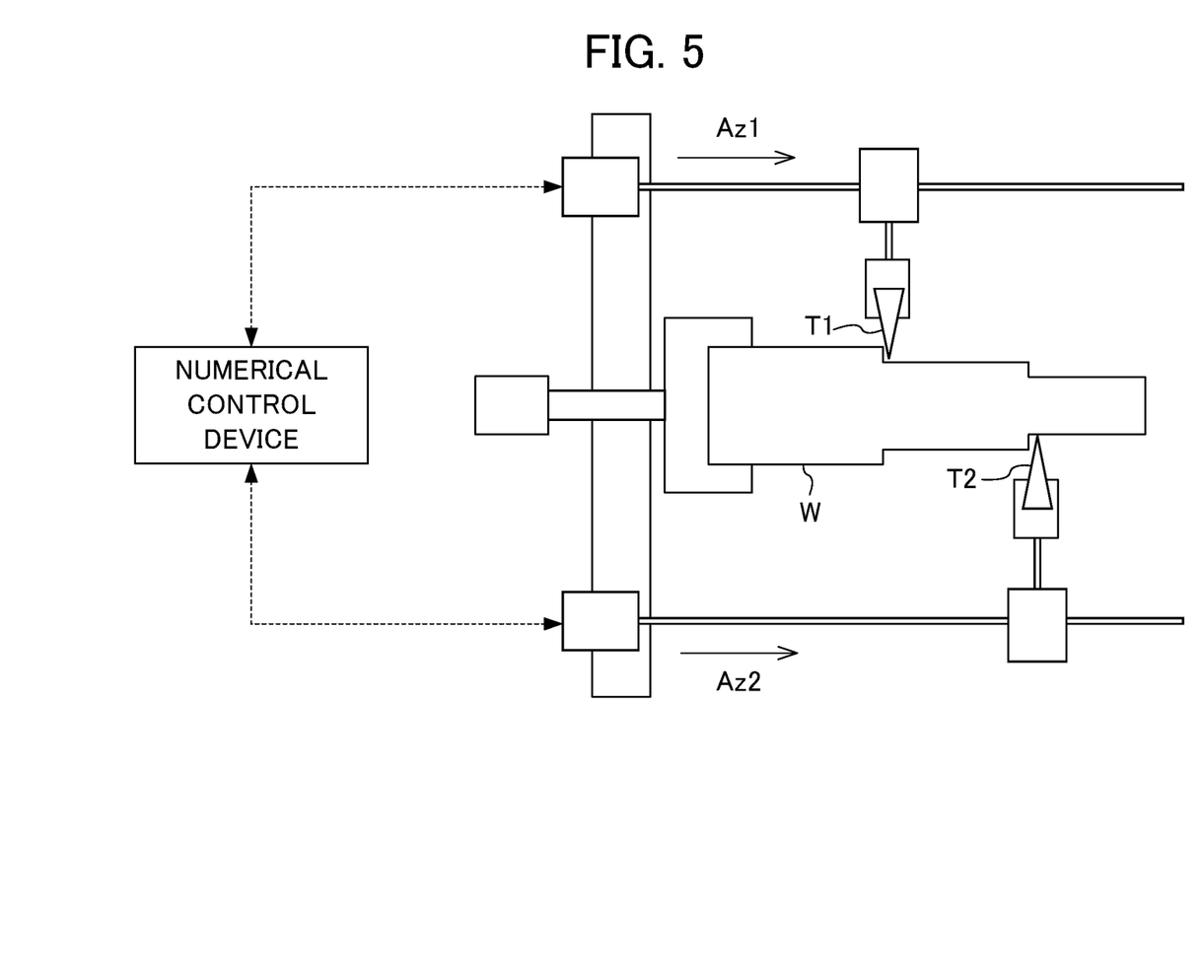
FIG. 5 is a schematic drawing showing the configuration of a modifies example of the machine tool according to the present disclosure.
Figure 6:
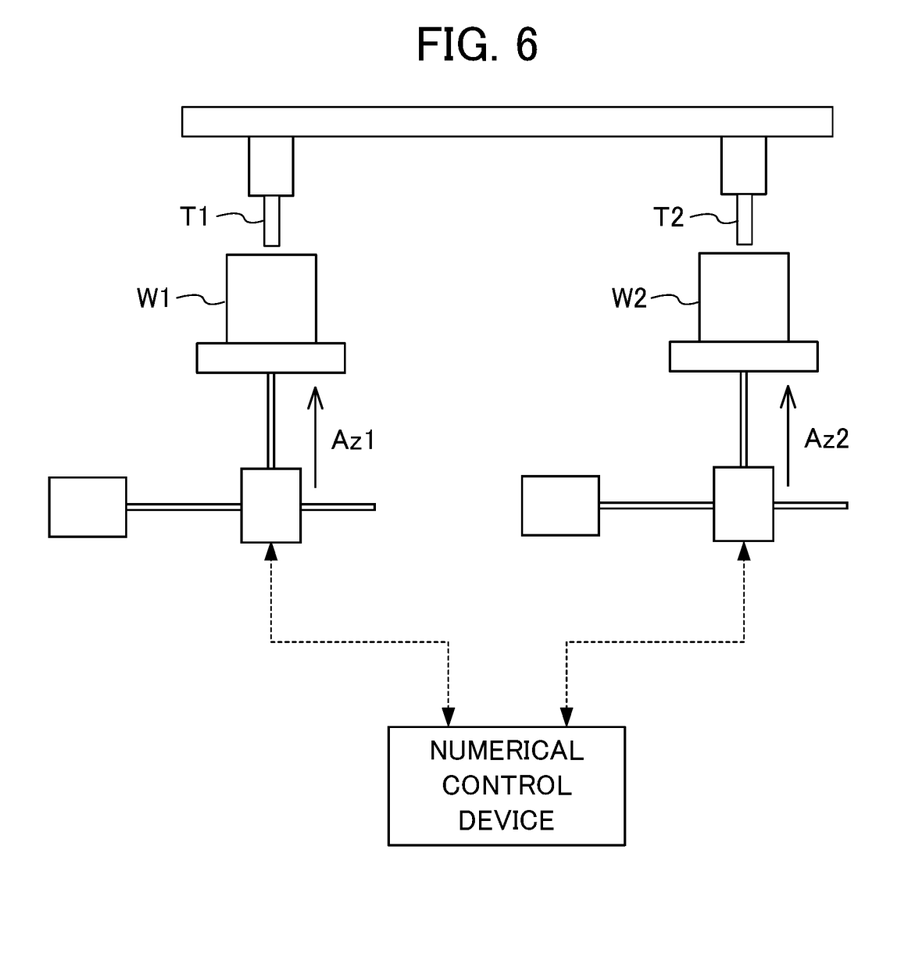
FIG. 6 is a schematic drawing showing the configuration of another modified example of the machine tool according to the present disclosure.

The machine tool according to the present disclosure may be a lathe including two oscillating drive axes Az1, Az2 which drive two tools T1, T2 which simultaneously machine different locations on a single workpiece W as shown in FIG. 5, or may be a multi-spindle machining center including two oscillating drive axes Az1, Az2 which cause a plurality of workpieces W1, W2 and plurality of rotary tools T1, T2 to relatively move, as shown in FIG. 6. Furthermore, the machine tool according to the present disclosure may be a multi-axis polishing device (not shown) which causes different abrasives (tools) or polishing targets (workpieces) to periodically change speed or may be a multi-axis EDM device (not shown) which causes the distance between a plurality of workpieces and an electrode to change. Therefore, the numerical control device according to the present disclosure can be applied to the control of a variety of such machine tools.

The numerical control device and machine tool according to the present disclosure may be applied not only for suppressing the vibrations which can occur due to contact between the tool and workpiece, but also for suppressing the vibration which can generate in a device due to the inertial force of the target drive by the oscillating drive axis. In other words, the numerical control device according to the present disclosure may control the phase and the amplitude of these oscillating drive axes so as to cancel out the inertial force of the tool, workpiece, etc. driven by the plurality of oscillating drive axes, and the bed, chuck, etc. retaining these. In addition, in this case, the oscillating drive axes that are driven may include a drive axis not necessitated in order for machining of the machine tool. As the drive axis not necessitated for machining, for example, it is possible to establish as a drive axis that drives the chuck, bed, etc. which do not retain the workpiece or tool.

Figure 7:
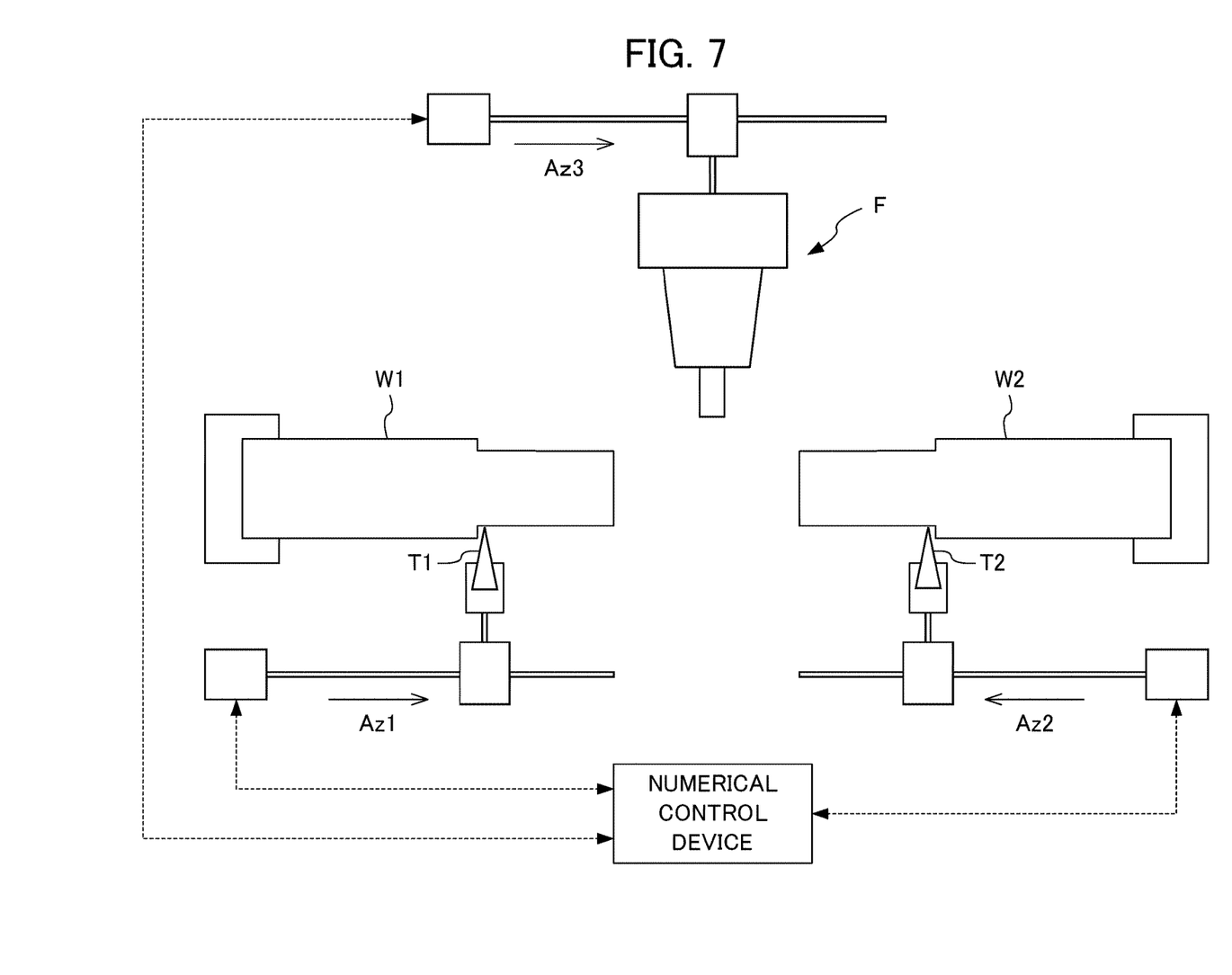
FIG. 7 is a schematic drawing showing the configuration of a further modified example of the machine tool according to the present disclosure.

As an example, the machine tool shown in FIG. 7 includes: the first oscillating drive axis Az1 which drives the first cutting tool T1 that turns the first workpiece W1; the second oscillating drive axis Az2 which drives the second cutting tool T2 that turns the second workpiece W2 in the same phase in a parallel direction as the first oscillating drive axis Az1; and the third oscillating drive axis Az3 which drives a milling head F, for example, a phase differing by half a period in a parallel direction to the first oscillating drive axis Az1 and second oscillating drive axis Az2 order to counterbalance vibration of the first oscillating drive axis Az1 and second oscillating drive axis Az2.

The numerical control device according to the present disclosure may control so as to set a plurality of groups each consisting of a plurality of oscillating drive axes, and keep fixed the phase difference of oscillating drive axes in each group. In this case, the period of speed change may differ among groups.

EXPLANATION OF REFERENCE NUMERALS 100 machine tool
1, 1a, 1b numerical control device
Az1, Az2 oscillating drive axis
W1, W2 workpiece
T1, T2 cutting tool (target)
10 program analysis unit
21, 22 first oscillation condition acquisition unit
30 phase difference setting unit
40, 40a reference phase acquisition unit
50, 50b oscillating phase setting unit
61, 62, 61b, 62b command generation unit
71, 72 reference value calculation unit
81, 82, 81b, 82b deviation calculation unit
91, 92 set point calculation unit

What is claimed is:

1. A numerical control device for controlling at least two oscillating drive axes which linearly drive so as to cause mutually differing targets to change speed regularly at a fixed period, based on a machining program, the numerical control device comprising:
an oscillation condition acquisition unit which acquires an amplitude and the frequency of the periodic variable component of the at least two oscillating drive axes from the machining program;
a phase difference setting unit which sets a phase difference of the periodic variable component of the at least two oscillating drive axes;
an oscillating phase setting unit which assigns different phases to the at least two oscillating drive axes so that the phase difference set by the phase difference setting unit is obtained; and
a command generation unit which generates a command signal that causes the at least two oscillating drive axes to operate in the phases assigned by the oscillating phase setting unit;
wherein the numerical control device controls the at least two oscillating drive axes so as to keep fixed the phase difference of periodic variable components of the at least two oscillating drive axes.

2. The numerical control device according to claim 1, wherein the oscillating phase setting unit calculates a phase of at least one other oscillating drive axis by adding the phase difference set by the phase difference setting unit to a phase of a specific one of the oscillating drive axes.

3. The numerical control device according to claim 2, wherein the command generation unit has a reference phase acquisition unit which acquires a phase serving as a reference, based on a value of a command signal to the specific oscillating drive axis or a value of a feedback signal from the oscillating drive axis.

4. The numerical control device according to claim 3, wherein the reference phase acquisition unit calculates a current phase of the specific oscillating drive axis, based on a value of the command signal to the specific oscillating drive axis or a value of the feedback signal from the oscillating drive axis, and an amplitude and a frequency of a periodic variable component acquired by the oscillation condition acquisition unit.

5. The numerical control device according to claim 1, wherein the command generation unit includes:
a reference value calculation unit which calculates a reference value corresponding to a fixed speed excluding the periodic variable component from the speed of the oscillating drive axis based on the machining program;
a deviation calculation unit which calculates a deviation from the reference value which changes periodically, in an amplitude and a frequency of the periodic variable component acquired by the oscillation condition acquisition unit, and a phase assigned by the oscillating phase setting unit; and
a set point calculation unit which calculates a set point for the oscillating drive axis by summing up the reference value and the deviation.

6. The numerical control device according to claim 1, wherein the numerical control device keeps a phase difference of two of the oscillating drive axes which drive targets in parallel directions to each other at substantially a half period.

7. The numerical control device according to claim 6, wherein the amplitudes of the periodic variable components of the two of the oscillating drive axes are substantially equal.

8. A machine tool comprising:
the numerical control device according to claim 1; and
at least two oscillating drive axes which are controlled by the numerical control device.

9. A numerical control device for controlling at least two oscillating drive axes which linearly drive so as to cause mutually differing targets to change speed regularly at a fixed period, based on a machining program,
wherein the numerical control device controls the at least two oscillating drive axes so as to keep fixed a phase difference of periodic variable components of the at least two oscillating drive axes, and
wherein the numerical control device keeps a phase difference of two of the at least two oscillating drive axes which drive targets in parallel directions to each other at substantially a half period, which is 180 degrees.

10. The numerical control device according to claim 9, comprising:
an oscillation condition acquisition unit which acquires an amplitude and the frequency of the periodic variable component of the at least two oscillating drive axes from the machining program;
a phase difference setting unit which sets a phase difference of the periodic variable component of the at least two oscillating drive axes;
an oscillating phase setting unit which assigns different phases to the at least two oscillating drive axes so that the phase difference set by the phase difference setting unit is obtained; and
a command generation unit which generates a command signal that causes the at least two oscillating drive axes to operate in the phases assigned by the oscillating phase setting unit.

11. The numerical control device according to claim 10, wherein the oscillating phase setting unit calculates a phase of at least one other oscillating drive axis by adding the phase difference set by the phase difference setting unit to a phase of a specific one of the oscillating drive axes.

12. The numerical control device according to claim 11, wherein the command generation unit has a reference phase acquisition unit which acquires a phase serving as a reference, based on a value of a command signal to the specific oscillating drive axis or a value of a feedback signal from the oscillating drive axis.

13. The numerical control device according to claim 12, wherein the reference phase acquisition unit calculates a current phase of the specific oscillating drive axis, based on a value of the command signal to the specific oscillating drive axis or a value of the feedback signal from the oscillating drive axis, and an amplitude and a frequency of a periodic variable component acquired by the oscillation condition acquisition unit.

14. The numerical control device according to claim 10, wherein the command generation unit includes:
a reference value calculation unit which calculates a reference value corresponding to a fixed speed excluding the periodic variable component from the speed of the oscillating drive axis based on the machining program;
a deviation calculation unit which calculates a deviation from the reference value which changes periodically, in an amplitude and a frequency of the periodic variable component acquired by the oscillation condition acquisition unit, and a phase assigned by the oscillating phase setting unit; and a set point calculation unit which calculates a set point for the oscillating drive axis by summing up the reference value and the deviation.

15. The numerical control device according to claim 9, wherein the amplitudes of the periodic variable components of the two of the oscillating drive axes are substantially equal.

\* \* \* \* \*